3,257,430
19-BISDIFLUORO-ANDROSTANES
Albert Bowers and James C. Orr, Mexico City, Mexico, assignors to Syntex Corporation, Panama, Panama, a corporation of Panama
No Drawing. Filed Sept. 21, 1962, Ser. No. 225,363
21 Claims. (Cl. 260—397.4)

The present invention relates to novel cyclopentanophenanthrene derivatives and to a process for the production thereof.

More particularly, the present invention relates to novel 19,19-difluoro androstane derivatives.

The novel compounds of the present invention are represented by the following formulae:

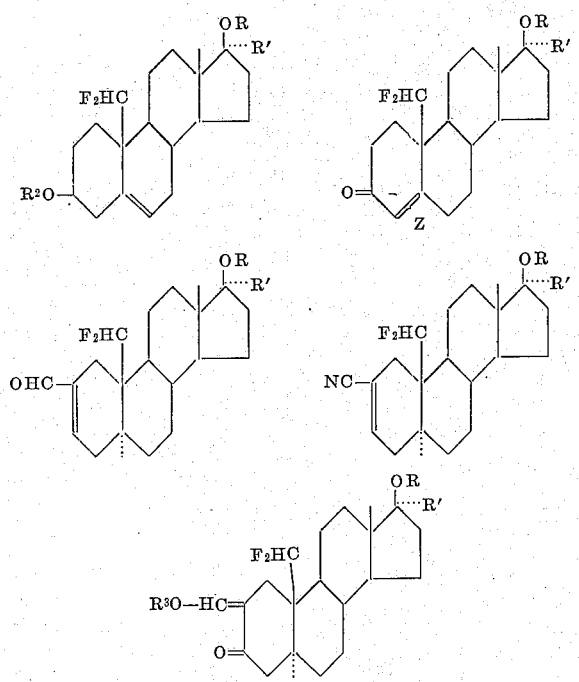

In the above formulae R represents hydrogen or a hydrocarbon carboxylic acyl group of less than 12 carbon atoms; R$^1$ represents hydrogen, lower alkyl, lower alkenyl or lower alkynyl; R$^2$ represents hydrogen or a hydrocarbon carboxylic acyl group of less than 12 carbon atoms; R$^3$ represents hydrogen, lower alkyl, or a hydrocarbon carboxylic acyl group of less than 12 carbon atoms; and Z represents a double bond or a saturated linkage between C–4 and C–5.

The acyl group are derived from hydrocarbon carboxylic acids containing less than 12 carbon atoms which may be saturated or unsaturated, of straight, branched, cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention represented by the above formulae are anabolic-androgenic agents with a favorable anabolic-androgenic ratio. In addition they have anti-estrogenic, anti-gonadotrophic, anti-fibrillatory and appetite stimulating properties. Furthermore, they lower the blood cholesterol level, relieve premenstrual tension, and suppress the output of the pituitary gland.

The compounds represented by the above formulae wherin R$^1$ is a lower alkynyl group, are also useful in fertility control.

The novel compounds of the present invention are prepared by the process illustrated as follows:

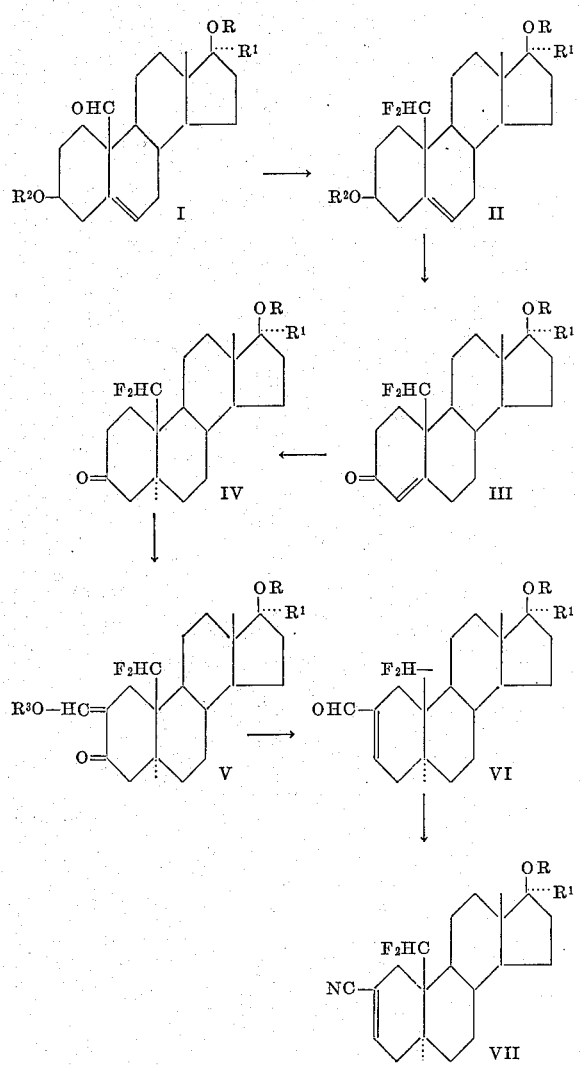

In the above formulae R, R$^1$, R$^2$, and R$^3$ have the same meaning as herein set forth.

The starting compound of the process just outlined which is a diacylate of a Δ$^5$-androstene-3β,17β-diol-19-al derivative (I), preferably the diacetate, is obtained in accordance with Bowers U.S. patent application Serial No. 201,768, filed June 12, 1962, by treatment of the corresponding acylate of Δ$^5$-androsten-3β-ol-17-one with hypobromous acid, reaction of the resulting 5α-bromo-6β-ol with lead tetraacetate, treatment of the resulting acylate of the corresponding 5α-bromo-6β,19-oxido-androstan-3β-ol-17-one with zinc in a lower aliphatic alcohol, reaction with dihydropyrane in the presence of p-toluenesulfonic acid of the resulting 3-acylate of Δ$^5$-androstene-3β,19-diol-17-one to give the corresponding 19-tetrahydropyranylether-3-acetate of Δ$^5$-androstene-3β,19-diol-17-one, reduction of the 17-keto group of the latter to give the corresponding 17β-alcohols, or treatment of the same 17-keto group with a lower (alkyl, alkenyl or alkynyl) magnesium bromide to give the corresponding 17α-hydrocarbon substituted-17β-ol, conventional esterification of the free alcohols to give the corresponding 3,17-diacylates-19-tetrahydropyranylether of the corresponding 17α-substituted or unsubstituted Δ$^5$-androstene-3β,17β,19-triol, acid hydrolysis of the 19-tetrahydropyranyl ether group followed by oxidation with chromium trioxide in pyridine to give the desired 3,17-diacylates of the corresponding $\Delta^5$-androstene-$3\beta,17\beta$-diol-19-al derivative.

In practicing the process outlined above the starting compound (I) is treated with 2 molar equivalents of sulphur tetrafluoride at 0–50° C. in a sealed vessel for a prolonged period of time of the order of 6 to 14 days, preferably for 8 days, to give the diacylate of the corresponding 19,19-difluoro-$\Delta^5$-androstene-$3\beta,17\beta$-diol (II), which, upon conventional saponification in a basic medium affords the corresponding $3\beta,17\beta$-free diol (II: $R^2=R=H$). The $17\alpha$-substituted 19,19-difluoro-$\Delta^5$-androstene-$3\beta,17\beta$-diol upon treatment under conventional Oppenaurer conditions, affords 19,19-difluoro-$\Delta^4$-androstene-3,17-dione which is reduced with a double metal hydride preferably sodium borohydride to give 19,19-difluoro-$\Delta^4$-androstene-$3\beta,17\beta$-diol which is finally treated with 2,3-dichloro-5,6-dicyano-1,4-benzoquinone (1 molar equivalent) in an inert solvent such as dioxane at room temperature, for a period of time of the order of 3 hours, thus affording 19,19-difluoro-$\Delta^4$-androstene-$17\beta$-ol-3-one (III: $R=R^1=H$). In the case of the $3\beta,17\beta$-diols with a substituent at C-$17\alpha$, the oxidation under Oppenaurer conditions gives directly the corresponding $17\alpha$-substituted-$\Delta^4$-androstene-$17\beta$-ol-3-one (III: $R=H$, $R^1=$lower aliphatic residue). The 19,19-difluoro-$\Delta^4$-androstene-$17\beta$-ol-3-one derivatives (III) are treated with an alkali metal such as lithium, in ammonia followed by treatment with ammonia chloride to give the corresponding 19,19-difluoro-androstene-$17\beta$-ol-3-one compounds (IV).

The latter compounds upon treatment with ethyl formate in the presence of sodium hydride and in an inert solvent such as benzene for a period of time of the order 24 hours, at room temperature, yield the corresponding 2-hydroxymethylene-19,19-difluoro-androstan - $17\beta$ - ol-3 - one derivatives (V: $R^3=H$) which are treated with an excess of a diazoalkane, preferably diazomethane, in ether to give the corresponding 2-alkoxymethylene compounds, preferably 2-methoxymethylene-19,19-difluoro-androstane-$17\beta$-ol-3-one compound (V: $R^3=$methyl). The latter derivatives upon reduction with a double metal hydride, preferably sodium borohydride followed by acid treatment, for example with hydrochloric acid yield the corresponding 2 - formyl-19,19-difluoro-$\Delta^2$-androsten-$17\beta$-ol compounds (VI). The last named compounds are treated with N,O-bis-(trifluoromethyl)-hydroxylamine in an inert solvent, such as benzene, under anhydrous conditions, for a period of time of the order of 4 hours, to give the corresponding 2-cyano-19,19-difluoro-$\Delta^2$-androsten-$17\beta$-ol derivatives (VII).

The compounds of the present invention having a secondary hydroxyl group, such as the $3\beta$-hydroxyl, or the $17\beta$-hydroxyl of the $17\alpha$-unsubstituted compounds, or a hydroxymethylene group, are conventionally acylated in pyridine with an acylating agent, such as an anhydride or a chloride of a hydrocarbon carboxylic acid of the type defined hereinbefore, thus affording the corresponding acylates.

The compounds of the present invention having a tertiary hydroxyl group, namely the $17\beta$-hydroxyl of the $17\alpha$-substituted derivatives, are conventionally esterified in the presence of p-toluenesulfonic acid or anhydrous sodium methoxide with excess of an acylating agent, such as acetic anhydride or caproic anhydride, to give the corresponding tertiary esters.

The following specific examples serve to illustrate but are not intended to limit the scope of the present invention:

PREPARATION 1

To a solution of 5 g. of $17\alpha$-methyl-$\Delta^5$-androstene-$3\beta,17\beta$-diol-19-al (obtained according to Bowers U.S. patent application Serial No. 201,768 filed June 12, 1962, in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the diacetate of $17\alpha$-methyl-$\Delta^5$-androstene-$3\beta,17\beta$-diol-19-al.

Following the same procedure there were treated $17\alpha$-vinyl-$\Delta^5$-androstene-$3\beta,17\beta$-diol-19-al and $17\alpha$-ethynyl-$\Delta^5$-androstene-$3\beta,17\beta$-diol-19-al (obtained in accordance with the aforesaid Appl.) to produce respectively: $17\alpha$-vinyl-$\Delta^5$-androstene-$3\beta,17\beta$-diol-19-al diacetate and $17\alpha$-ethynyl-$\Delta^5$-androstene-$3\beta,17\beta$-diol-19-al, diacetate.

Example I 500 mg. of the diacetate of $\Delta^5$-androstene-$3\beta,17\beta$-diol-19-al, obtained in accordance with the aforesaid patent application, were dissolved in 15 cc. of chloroform containing 0.3 cc. of ethanol in a stainless steel bomb. The solution was cooled to $-70°$ C., 1 cc. of sulfur tetrafluoride was added, and the tube sealed with a stainless steel stopper. After 8 days at 0–50° C. the steel bomb was again cooled, opened, and the contents of the tube poured into aqueous sodium carbonate. Extraction with ethyl acetate, washing to neutral with water, drying, and evaporation to dryness gave a non-crystalline solid. Chromatography on alumina gave the diacetate of 19,19-difluoro-$\Delta^5$-androstene-$3\beta,17\beta$-diol (Compound No. 1).

Following the same procedure there were treated the diacetate of $17\alpha$-methyl-$\Delta^5$-androstene-$3\beta,17\beta$-diol-19-al, the diacetate of $17a$-vinyl-$\Delta^5$-androstene-$3\beta,17\beta$-diol-19-al and the diacetate of $17\alpha$-ethynyl-$\Delta^5$-androstene-$3\beta,17\beta$-diol-19-al, thus affording respectively: the diacetate of 19,19 - difluoro - $17\alpha$ - methyl-$\Delta^5$-androstene-$3\beta,17\beta$-diol (Cpd. No. 2), the diacetate of 19,19-difluoro-$17\alpha$-vinyl-$\Delta^5$-androstene-$3\beta,17\beta$-diol (Cpd. No. 3) and the diacetate of 19,19 - difluoro - $17\alpha$ - ethynyl-$\Delta^5$-androstene-$3\beta,17\beta$-diol (Cpd. No. 4).

Example II

A suspension of 1 g. of 19,19-difluoro-$\Delta^5$-androstene-$3\beta,17\beta$-diol diacetate (Cpd. No. 1) in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 19,19-difluoro-$\Delta^5$-androstene-$3\beta,17\beta$-diol (Cpd. No. 5).

Example III

A solution of 0.17 g. of potassium hydroxide in 0.2 cc. of water and 2.5 cc. of methanol was added over 30 minutes to a boiling solution of 1 g. of the diacetate of 19,19-difluoro-$17\alpha$-methyl-$\Delta^5$-androstene-$3\beta,17\beta$-diol (Cpd. No. 2), in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 19,19-difluoro-$17\alpha$-methyl-$\Delta^5$-androstene-$3\beta,17\beta$-diol (Cpd. No. 6).

The compounds Nos. 3 and 4, were treated by the same procedure, thus affording respectively: 19,19-difluoro-$17\alpha$-vinyl-$\Delta^5$-androstene-$3\beta,17\beta$-diol (Cpd. No. 7) and 19,19-difluoro-$17\alpha$-ethynyl-$\Delta^5$-androstene-$3\beta,17\beta$-diol (Cpd. No. 8).

Example IV

A solution of 1 g. of 19,19-difluoro-$\Delta^5$-androstene-$3\beta,17\beta$-diol (Cpd. No. 5) in 80 cc. of toluene and 20 cc. of cyclohexanone was dried by distilling off 10 cc.

of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 19,19-difluoro-$\Delta^4$-androstene-3,17-dione (Cpd. No. 9).

By the same procedure the compounds Nos. 6, 7 and 8 were respectively converted into: 19,19-difluoro-17α-methyl-$\Delta^4$-androstene-17β-ol-3-one (Cpd. No. 10), 19,19-difluoro-17α-vinyl-$\Delta^4$-androstene-17β-ol-3-one (Cpd. No. 11) and 19,19-difluoro-17α-ethynyl-$\Delta^4$-androstene-17β-ol-3-one (Cpd. No. 12).

Example V

A solution of 2 g. of sodium borohydride in 30 cc. of methanol was added with stirring to a solution of 2 g. of Compound No. 9 in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave 19,19-difluoro-$\Delta^4$-androstene - 3β,17β - diol (Cpd. No. 13).

A mixture of 1 g. of the latter product in 20 cc. of dioxane, and 1.1 molar equivalents of 2,3-dichloro, 5,6-dicyano, 1,4-benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone-hexane gave 19,19 - difluoro - $\Delta^4$ - androsten-17β-ol-3-one (Cpd. No. 14).

Example VI

A solution of 1 g. of Compound No. 14 in 20 cc. of dioxane-ether (1:1) was added in a steady stream to a solution of 0.1 g. of lithium in 100 cc. of anhydrous liquid ammonia with good stirring. At the end of the addition the blue color was discharged by the addition of 5 g. of ammonium chloride and the ammonia was allowed to evaporate. The product was extracted with ether, washed with water, dried and the ether evaporated to afford a gum which was adsorbed from 100 cc. of benzene onto 50 g. of alumina. Elution with benzene-ether afforded a product which upon recrystallization from acetone-hexane gave 19,19-difluoro-androstane-17β-ol-3-one (Cpd. No. 15).

The compounds Nos. 10, 11 and 12 were treated by the same procedure, thus affording respectively: 19,19-difluoro-17α-methyl-androstane-17β-ol-3-one (Cpd. No. 16), 19,19 - difluoro-17α-vinyl-androstane-17β-ol-3-one (Cpd. No. 17) and 19,19-difluoro-17α-ethynyl-androstane-17β-ol-3-one (Cpd. No. 18).

Example VII

To a solution of 3 g. of 19,19-difluoroandrostane-17β-ol-3-one (Cpd. No. 15) in 60 cc. of anhydrous benzene was added 3 cc. of ethyl formate and 1.3 g. of sodium hydride, suspended in mineral oil while cooling and stirring under an atmosphere of nitrogen. The mixture was stirred for 24 hours at room temperature, hexane was added until complete precipitation, the solid was collected and dried under vacuum. The crude material was suspended in aqueous hydrochloric acid and stirred at room temperature for half an hour. The precipitate was collected, washed with water and dried. Recrystallization from methylenechloride-hexane gave 2-hydroxymethylene-19,19-difluoro-androstane-17β-ol-3-one (Cpd. No. 19).

The compounds Nos. 16, 17 and 18 were treated by the above method to produce respectively:

Cpd. No.:
    20. 2-hydroxymethylene-19,19-difluoro-17α-methyl-androstane-17β-ol-3-one.
    21. 2-hydroxymethylene-19,19-difluoro-17α-vinyl-androstane-17β-ol-3-one.
    22. 2-hydroxymethylene-19,19-difluoro-17α-ethynyl-androstane-17β-ol-3-one.

Example VIII

To a solution of 3 g. of 2-hydroxymethylene-19,19-difluoro-androstane-17β-ol-3-one (Cpd. No. 19) in 50 cc. of methylene chloride was added an excess of diazomethane in ether (obtained from N-nitrosomethylurea) and a few drops of methanol. The reaction mixture was kept at room temperature for 18 hours. The excess reagent was decomposed with acetic acid. The resulting mixture was poured into water, the organic layer washed until neutral and evaporated to dryness. Recrystallization from acetone-hexane afforded 2-methoxymethylene - 19,19 - difluoro-androstane-17β-ol-3-one (Cpd. No. 23).

The compounds Nos. 20, 21 and 22 were treated by the same procedure, thus giving respectively:

Cpd. No.:
    24. 2-methoxymethylene-19,19-difluoro-17α-methyl-androstane-17β-ol-3-one.
    25. 2-methoxymethylene-19,19-difluoro-17α-vinyl-androstane-17β-ol-3-one.
    26. 2-methoxymethylene-19,19-difluoro-17α-ethynyl-androstane-17β-ol-3-one.

Example IX

A solution of 1 g. of sodium borohydride in 3 cc. of water was added to an ice-cooled solution of 1 g. of 2-methoxymethylene - 19,19-difluoro - androstan-17β-ol-3-one (Cpd. No. 23) in 120 cc. of methanol and the mixture was allowed to stand for 16 hours at room temperature. The excess reagent was decomposed by addition of acetic acid; the solution was then acidified with 1 cc. of concentrated hydrochloric acid and left at room temperature for 10 minutes. It was thereafter concentrated to small volume in vacuo and diluted with water. The product was extracted with ethyl acetate, the extract was washed with water, dried and evaporated. The solid residue was purified by crystallization from acetone-hexane to give 2-formyl-19,19-difluoro-$\Delta^2$-androstene-17β-ol (Cpd. No. 27).

Following the above procedure the compounds Nos. 24, 25 and 26 were respectively converted into:

Cpd. No.:
    28. 2-formyl-19,19 - difluoro-17α - methyl-$\Delta^2$-androstene-17β-ol.
    29. 2-formyl - 19,19 - difluoro-17α-vinyl-$\Delta^2$-androstene-17β-ol.
    30. 2-formyl - 19,19 - difluoro-17α-ethynyl-$\Delta^2$-androstene-17β-ol.

Example X

A solution of 3 g. of 2-formyl-19,19-difluoro-$\Delta^2$-androstene-17β-ol (Cpd. No. 27) in 70 cc. of benzene was concentrated to a volume of 50 cc. in order to remove moisture. Thereafter, 1 cc. of pyridine and 2 g. of N,O-bis trifluoromethyl hydroxylamine were added, and the mixture was refluxed for 4 hours. The solution was poured into water, extracted with ethyl acetate, the extract washed with water, dried over sodium sulfate and evaporated to dryness. Upon chromatography on 100 g. of alumina there was produced: 2-cyano-19,19-difluoro-$\Delta^2$-androstene-17β-ol (Cpd. No. 31).

The compounds Nos. 28, 29 and 30 were treated according to the above technique, thus yielding respectively:

Cpd. No.:
- 32. 2-cyano - 19,19-difluoro - 17α-methyl-Δ²-androstene-17β-ol.
- 33. 2-cyano - 19,19- -difluoro - 17α-vinyl-Δ²-androstene-17β-ol.
- 34. 2-cyano - 19,19 - difluoro - 17α-ethynyl-Δ²-androstene-17β-ol.

*Example XI*

A mixture of 1 g. of 19,19-difluoro-Δ⁴-androstene-17β-ol-3-one (Cpd. No. 14) 4 cc. of pyridine and 2 cc. of acetic anhydride was kept at room temperature overnight, poured into ice water, the formed precipitate was filtered, washed with water and dried. Crystallization from acetonehexane gave 19,19-difluoro-Δ⁴-androsten-17β-ol-3-one acetate (Cpd. No. 35).

Following the same procedure there were treated the compounds Nos. 15, 19, 23, 27 and 31 yielding respectively:

Cpd. No.:
- 36. 19,19 - difluoro - androstone - 17β-ol-3-one acetate.
- 37. 2-acetoxy - methylene-19,19-difluoro-androstane-17β-ol-3-one acetate.
- 38. 2-methoxymethylene - 19,19-difluoro-androstane-17β-ol-3-one acetate.
- 39. 2-formyl - 19,19 - difluoro-Δ²-androstane-17β-ol acetate.
- 40. 2-cyano - 19,19 - difluoro-Δ²-androstene-17β-ol acetate.

*Example XII*

The starting compounds of the foregoing example, were treated in accordance with that example, except that acetic anhydride was substituted by caproic anhydride and by enanthic anhydride, thus affording respectively the corresponding caproates and enanthates of said starting compounds.

*Example XIII*

To a solution of 5 g. of 19,19-difluoro-17α-methyl-Δ⁴-androstene-17β-ol-3-one (Cpd. No. 10) in 100 cc. of anhydrous benzene there were added 1 g. of p-toluene-sulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19,19-difluoro-17α-methyl-Δ⁴-androstene-17β-ol-3-one acetate (Cpd. No. 41).

The compounds Nos. 11, 12, 16, 17, 18, 20, 21, 22, 24, 25, 26, 28, 29, 30, 32, 33 and 34 were treated by the above procedure, to give respectively:

Cpd. No.:
- 42. 19,19-difluoro-17α-vinyl-Δ⁴androstene-17β-ol - 3-one acetate.
- 43. 19,19-difluoro-17α-ethynyl-Δ⁴-androstene-17β - ol-3-one acetate.
- 44. 19,19-difluoro-17α-methyl-androstane-17β-ol - 3-one acetate.
- 45. 19,19-difluoro-17α-vinyl-androstane-17β-ol-3-one acetate.
- 46. 19,19-difluoro-17α-ethynyl-androstane-17β-ol - 3-one acetate.
- 47. 2-acetoxymethylene-19,19-difluoro-17α - methyl-androstane-17β-ol-3-one acetate.
- 48. 2-acetoxymethylene-19,19-difluoro - 17α - vinyl-androstane-17β-ol-3-one acetate.
- 49. 2-acetoxymethylene-19,19-difluoro-17α - ethynyl-androstane-17β-ol-3-one acetate.
- 50. 2-methoxymethylene-19,19-difluoro-17α-methyl-androstane-17β-ol-3-one acetate.
- 51. 2-methoxymethylene-19,19-difluoro-17α - vinyl-androstane-17β-ol-3-one acetate.
- 52. 2-methoxymethylene-19,19-difluoro-17α - ethynyl-androstane-17β-ol-3-one acetate.
- 53. 2-formyl-19,19-difluoro-17α-methyl - Δ² - androstene-17β-ol acetate.
- 54. 2-formyl-19,19-difluoro-17α-vinyl-Δ²-androstene-17β-ol acetate.
- 55. 2-formyl-19,19-difluoro-17α-ethynyl-Δ² - androstene-17β-ol acetate.
- 56. 2-cyano-19,19-difluoro-17α-methyl-Δ²-androstene-17β-ol acetate.
- 57. 2-cyano-19,19-difluoro-17α-vinyl-Δ² - androstene-17β-ol acetate.
- 58. 2-cyano-19,19-difluoro-17α-ethynyl - Δ² - androstene-17β-ol acetate.

EXAMPLE XIV

The starting compounds of the preceding example were treated in accordance with that example, except that acetic anhydride was substituted by caproic anhydride and by undecenoic anhydride, thus affording respectively the corresponding caproates and undecenoates of said starting compounds.

We claim:

1. A compound of the following formula:

[Chemical structure: steroid skeleton with F₂HC group, R²O− substituent, and OR, R' substituents at 17-position]

wherein R and R² are selected from the group consisting of hydrogen and a hydrocarbon carboxylic acyl group of less than 12 carbon atoms; and R¹ is a member of the group consisting of hydrogen, lower alkyl, lower alkenyl and lower alkynyl.

2. 19,19-difluoro-Δ⁵-androstene-3β,17β-diol.
3. 17α-methyl-19,19-difluoro-Δ⁵-androstene-3β,17β-diol.
4. 17α-vinyl-19,19-difluoro-Δ⁵-androstene-3β,17β-diol.
5. 17α-ethynyl-19,19-difluoro-Δ⁵-androstene-3β,17β-diol.
6. A compound of the following formula:

[Chemical structure: steroid skeleton with F₂HC group, O= at 3-position, Z linkage, and OR, R' substituents at 17-position]

wherein R is selected from the group consisting of hydrogen, and a hydrocarbon carboxylic acyl group of less than 12 carbon atoms; R¹ is a member of the group consisting of hydrogen, lower alkyl, lower alkenyl and lower alkynyl; and Z is selected from the group consisting of a double bond and a saturated linkage between C–4 and C–5.

7. 19,19-difluoro-Δ⁴-androsten-17β-ol-3-one.
8. 17α-methyl-19,19-difluoro-Δ⁴-androsten-17β-ol-3-one.
9. 17α-vinyl-19,19-difluoro-Δ⁴-androsten-17β-ol-3-one.
10. 17α-ethynyl-19,19-difluoro-Δ⁴-androsten-17β-ol - 3-one.

11. A compound of the following formula:

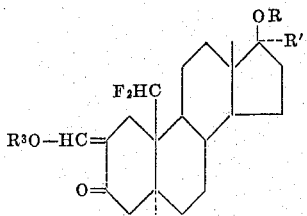

wherein R is selected from the group consisting of hydrogen, and a hydrocarbon carboxylic acyl group of less than 12 carbon atoms; $R^1$ is a member of the group consisting of hydrogen, lower alkyl, lower alkenyl and lower alkynyl; and $R^3$ is selected from the group consisting of hydrogen, lower alkyl and a hydrocarbon carboxylic acyl group of less than 12 carbon atoms.

12. 2-hydroxymethylene-19,19-difluoro-androstan-17$\beta$-ol-3-one.

13. 2-hydroxymethylene-19,19-difluoro - 17$\alpha$ - methyl-androstan-17$\beta$-ol-3-one.

14. 2-hydroxymethylene-19,19-difluoro - 17$\alpha$ - vinyl-androstan-17$\beta$-ol-3-one.

15. 2-hydroxymethylene-19,19-difluoro-17$\alpha$ - ethynyl-androstan-17$\beta$-ol-3-one.

16. A compound of the following formula:

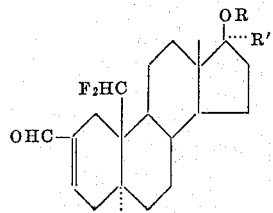

wherein R is selected from the group consisting of hydrogen, and a hydrocarbon carboxylic acyl group of less than 12 carbon atoms; and $R^1$ is a member of the group consisting of hydrogen, lower alkyl, lower alkenyl and lower alkynyl.

17. 2-formyl-19,19-difluoro-$\Delta^2$-androsten-17$\beta$-ol.

18. 2-formyl-19,19-difluoro-17$\alpha$-methyl-$\Delta^2$ - androsten-17$\beta$-ol.

19. A compound of the following formula:

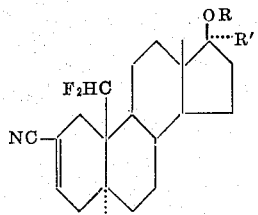

wherein R is selected from the group consisting of hydrogen, and a hydrocarbon carboxylic acyl group of less than 12 carbon atoms; and $R^1$ is a member of the group consisting of hydrogen, lower alkyl, lower alkenyl and lower alkynyl.

20. 2-cyano-19,19-difluoro-$\Delta^2$-androsten-17$\beta$-ol.

21. 2-cyano-19,19-difluoro-17$\alpha$-methyl-$\Delta^2$ - androsten-17$\beta$-ol.

References Cited by the Examiner

UNITED STATES PATENTS 3,101,356   8/1963   Bowers _____ 260—397.4
3,101,357   8/1963   Bowers _____ 260—397.4

LEWIS GOTTS, *Primary Examiner.*